United States Patent
Kajio et al.

(10) Patent No.: US 7,864,098 B2
(45) Date of Patent: Jan. 4, 2011

(54) RADAR DEVICE AND METHOD FOR ADJUSTING AMONG RADAR SITES

(75) Inventors: Hiroshi Kajio, Kawasaki (JP); Toshio Nanba, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/018,419

(22) Filed: Jan. 23, 2008

(65) Prior Publication Data
US 2008/0284638 A1 Nov. 20, 2008

Related U.S. Application Data

(60) Division of application No. 11/724,228, filed on Mar. 15, 2007, which is a continuation of application No. PCT/JP2006/320110, filed on Oct. 6, 2006.

(30) Foreign Application Priority Data

Oct. 7, 2005 (JP) ............................. 2005-295459

(51) Int. Cl.
*G01S 13/00* (2006.01)
(52) U.S. Cl. ...................................... 342/59
(58) Field of Classification Search .................. 342/33, 342/36, 59, 82, 83, 159
See application file for complete search history.

(56) References Cited

U.S. PATENT DOCUMENTS

| | | | |
|---|---|---|---|
| 3,029,429 A | 4/1962 | Rodgers | |
| 4,896,159 A | 1/1990 | Sabatini et al. | |
| 7,304,939 B2 * | 12/2007 | Steer et al. | ................... 370/208 |
| 2003/0025629 A1 | 2/2003 | Barrick et al. | |
| 2003/0179128 A1 | 9/2003 | Mende et al. | |
| 2004/0047324 A1 * | 3/2004 | Diener | ....................... 370/338 |
| 2004/0056793 A1 | 3/2004 | Matsubara et al. | |
| 2005/0156780 A1 | 7/2005 | Bonthron et al. | |

FOREIGN PATENT DOCUMENTS

| | | |
|---|---|---|
| GB | 2 134 741 A | 8/1984 |
| JP | 62-017679 A | 1/1987 |
| JP | 6-138215 | 5/1994 |
| JP | 10-160828 A | 6/1998 |
| JP | 11-223673 | 8/1999 |
| JP | 2002-139565 A | 5/2002 |
| JP | 2003-121538 A | 4/2003 |
| JP | 2004-109046 A | 4/2004 |
| JP | 2004-511783 A | 4/2004 |

OTHER PUBLICATIONS

Takashi Yoshida, "Revised Radar Technique", The Institute of Electronics, Information and Communication, p. 217.

* cited by examiner

*Primary Examiner*—Ian J Lobo
(74) *Attorney, Agent, or Firm*—Oblon, Spivak, McClelland, Maier & Neustadt, L.L.P.

(57) ABSTRACT

A radar device includes a generation unit, a transmission unit, and a control unit. The generation unit selectively generates a set of a plurality of transmission signals whose center frequencies are different from one another within an assigned frequency band. The transmission unit emits the transmission signals. The control unit controls the generation unit so as to vary the center frequencies for each emission of the transmission signals.

3 Claims, 4 Drawing Sheets ium Patent Application No. 2005-295459, filed Oct. 7, 2005, the entire contents of each of which are incorporated herein by reference.

BACKGROUND OF THE INVENTION

1. Field of the Invention

The present invention relates to a radar device and a method for adjusting to remove radio wave interference occurring among radar sites.

2. Description of the Related Art

A radar device (hereinafter, referred to as interfered station) sometimes receives a radio wave (hereinafter, referred to as transmission signal) emitted from other adjacent radar devices (hereinafter, referred to as interfering station), or a radio wave (hereinafter, referred to as echo signal) emitted from the interfering station and reflected from a target. If a center frequency of the received signal is close If a center frequency of the received signal is close to a center frequency of a transmitted signal, interference occurs. Therefore, a conventional radar device has an interference wave removal function ("Revised Radar Technique" Supervised by Takashi Yoshida, Published by The Institute of Electronics, Information and Communication Engineers, Page 217). As an example of the interference wave removal function, there is a method for mutually amplitude-comparing echo signals at a prescribed distance in a continuous pulse repetition interval (PRI), assuming that an echo signal with a large amplitude difference as an interference wave, and replacing the echo signal with an amplitude value of the echo signal received in the last PRI.

However, in practice, if pulse repetition frequencies (PRFs) of the interfering stations are close to one another, or if the number of the interfering stations is large, a plurality of interference waves are resulted in continuous receptions and, these interference waves affect the precision of radar signal processing data.

As a related problem, in a radar device emitting transmission signals having a plurality of types of pulse widths and moderation methods, overlapping a secondary echo with a weak real echo signal makes it difficult the real echo signal.

Further, in a radar device using a plurality of types of transmission pulse signals, interference among pulse signals significantly affect the detection precision of the echo signal. For example, in a pulse compression radar device using a short pulse and a long pulse in the PRF, the short pulse for short range leaks into a long-range area, and it results in reducing the echo detection precision of the long pulse.

As mentioned above, in the conventional radar device, if pulse repetition frequencies (PRFs) of the interfering stations are close to one another, or if the number of the interfering stations is large, these interference waves affect on the precision of the radar signal processing data. Increasing the effect of the secondary echo reduces the detection precision of the real echo signal. Further, in the case of using a plurality of types of transmission pulse signals, the interference among the pulse signals significantly affect the detection precision of the echo signal.

BRIEF SUMMARY OF THE INVENTION

A radar device regarding the invention includes a generation unit which selectively generates a set of a plurality of transmission signals whose center frequencies are different from one another within an assigned frequency band, a transmission unit which emits the transmission signals, and a control unit which controls the generation unit so as to vary the center frequencies for each emission of the transmission signals.

A radar device regarding the invention includes a generation unit which selectively generates transmission signals in a plurality of types of pulse widths or modulation methods, a transmission unit which emits the transmission signals, and a control unit which varies the types of pulse widths or modulation methods for each emission of the transmission signals.

A method for adjusting among radar sites, each radar site performs generating selectively a set of a plurality of transmission signals differing from one another in center frequency, emitting the transmission signals, switching the center frequencies of the transmission signals for each emission of the transmission signals, and associating with one or more other radar sites for controlling the switching so that each of the center frequencies of the each radar sites do not overlap with a center frequency of a transmission signal of the one or more other radar site.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, an embodiment of the present invention will be described in detail with reference to the drawings.

Figure 1:
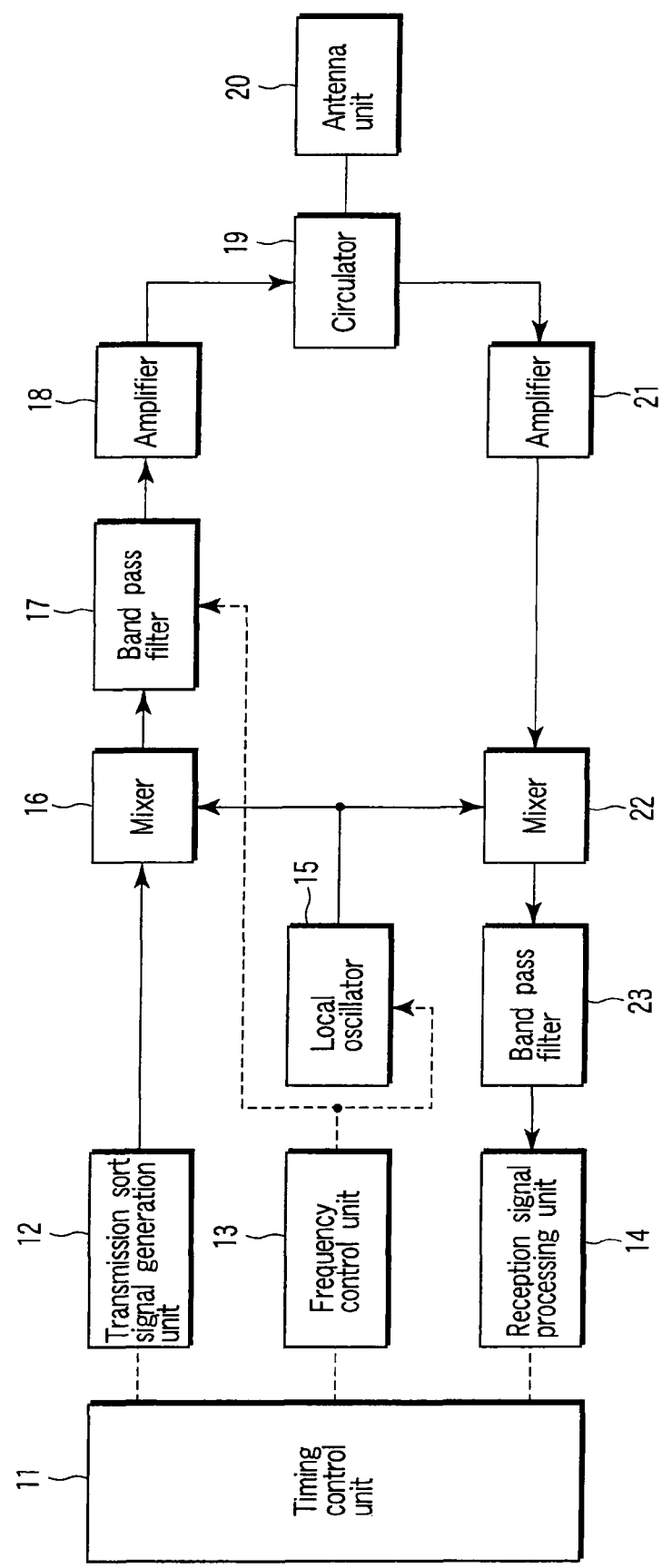
FIG. 1 is a block diagram illustrating an example of a configuration of a radar device regarding one embodiment of the invention.

FIG. 1 is a block diagram showing an example of a configuration of a radar device regarding one embodiment of the invention. In FIG. 1, a timing control unit 11 controls processing of the whole of the device, and mainly controls the processing timings of a transmission sort signal generation unit 12, a frequency control unit 13 and a reception signal processing unit 14.

The generation unit 12 generates a transmission sort signal of a preset RPF, pulse width and modulation method in accordance with an instruction from the timing control unit 11. The frequency control unit 13 controls an oscillation frequency from a local oscillator 15 and a passing frequency band of a first band pass filter 17, and the reception signal processing unit 14 performs processing to detect a target from a received echo signal.

By drive control performed by the timing control unit 11, the transmission sort signal generated from the signal generation unit 12 is mixed with a local signal output from the oscillator 15 at a first mixer 16 to be converted into a signal in a radio frequency (RF) band. The first band pass filter 17 removes a signal of a video frequency component from the transmission sort signal in the RF band; thereby it extracts only a signal of a desired frequency component. The signal extracted here is amplified by a first amplifier 18 to be a transmission signal, supplied to an antenna unit 20 through a circulator 19, and emitted to the atmosphere via the antenna unit 20.

The echo signal generated through the emission of the transmission signal to the atmosphere and through the reflection at the object is caught by an antenna unit 20 and supplied to a second amplifier 21 via the circulator 19. The echo signal supplied to the second amplifier 21 is amplified by the second amplifier 21 and frequency-converted into a signal in an intermediate frequency (IF) band together with the signal transmitted from the local oscillator 15. Then, a second band pass filter 23 removes the signal of the video frequency component, the interference waves differing in the center frequency and an unnecessary signal such as a secondary echo, and extracts only the signal of the desired frequency component. The signal extracted here is supplied to the reception signal processing unit 14 for processing, such as that for interference removal.

The feature of the embodiment is to have a function of varying the transmission frequencies of the transmission signals emitted to the atmosphere by switching the oscillation frequency of the local oscillator 15 and the frequency property of the first band pass filter 17 by means of the frequency control unit 13 for each emission of the transmission signals.

In the aforementioned configuration, operations of the invention will be described with reference to FIG. 2, FIG. 3 and FIG. 4 hereinafter.

Figure 2:
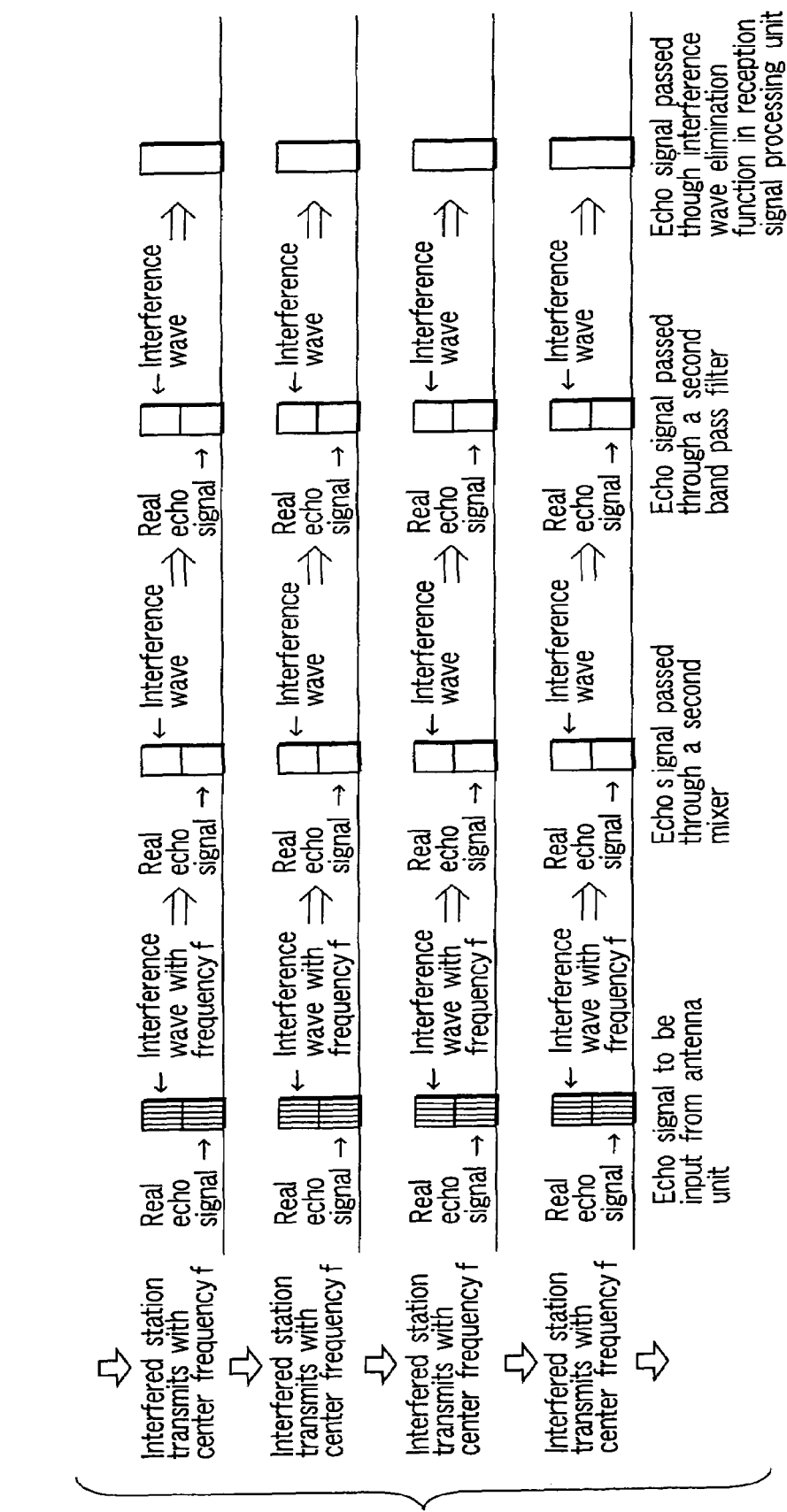
FIG. 2 is a timing diagram illustrating an example in the case in which interference waves get mixed in with and overlap the waves generated by a radar device of a conventional method.

FIG. 2 shows an example in the case in which interference waves get mixed in and overlap with the waves of a radar device in a conventional method, and it is presumed that RPFs, signal waveforms and center frequencies of the interference waves are the same as those of the transmission signal transmitted from the interfered station. In this case, the level of the echo signal which has passed through the interference removal function and has been detected as larger than that of the real echo signal, so there is a possibility that the conventional radar device conducts erroneous detection.

Figure 3:
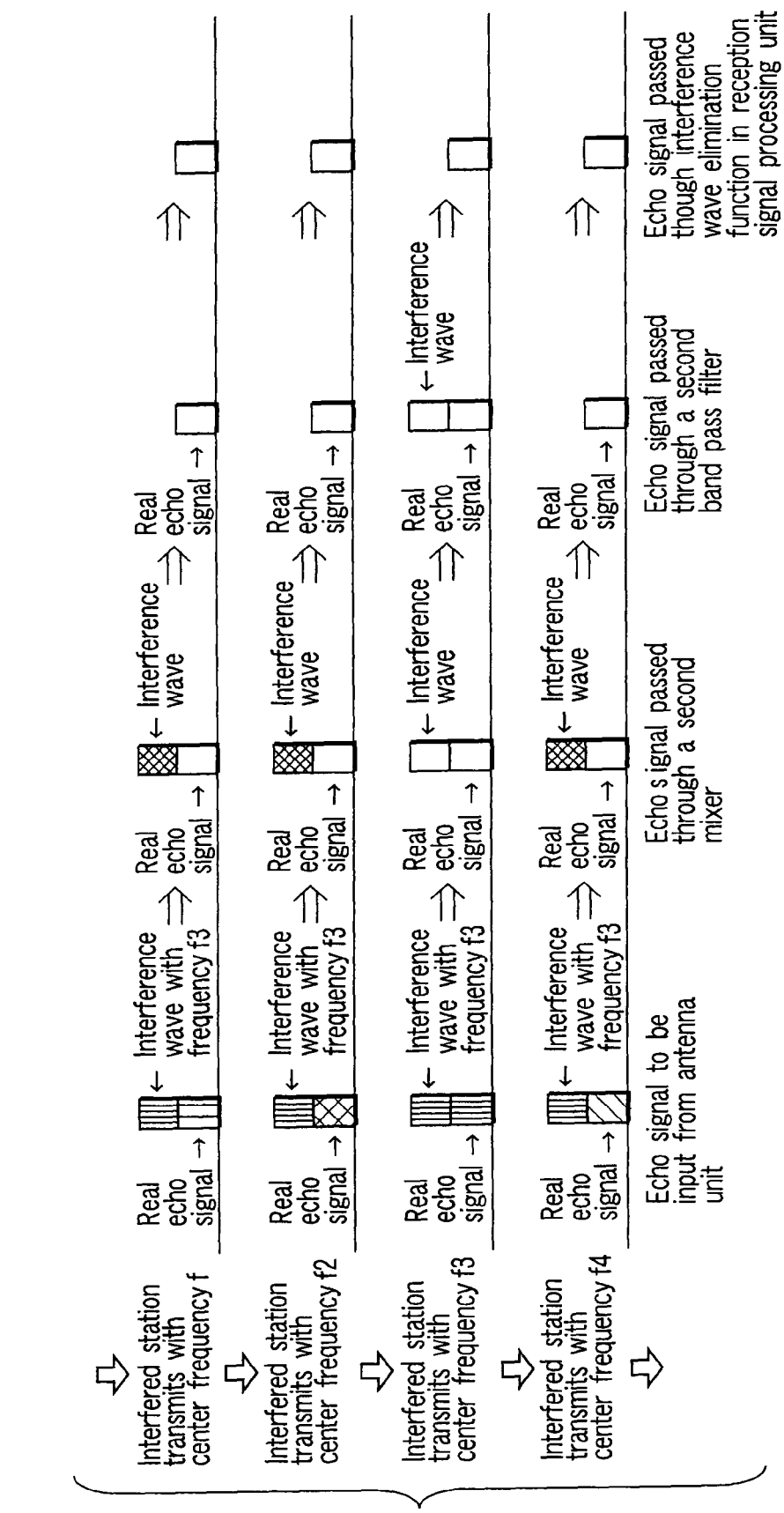
FIG. 3 is a timing diagram illustrating an example in the case in which it is assumed that the invention is applied to a station suffering interference (an interfered station) to vary the center frequencies for each transmission, a PRF and a signal waveform of an interfering station are the same as those of the interfered station and also center frequencies for each transmission are constant.

FIG. 3 shows an example of the case in which it is supposed that the invention is applied to the interfered station to vary the center frequencies of the transmission signals in order of f1, f2, f3 and f4 at every transmission, the PRFs and the signal waveforms of the interference waves from the interfering stations are the same as those of the transmission signal from the interfered station, and also the center frequency for each transmission is f3 and constant. In this case, except for the case where the center frequency of the interfered station is f3, the interfering waves are removed from the echo signal in passing through the second band pass filter 23.

When the center frequency is f3, the signal level becoming larger than those of the signals with other center frequencies, the conventional interference wave removal function can remove the interference waves; thereby the real echo signal can be detected.

Figure 4:
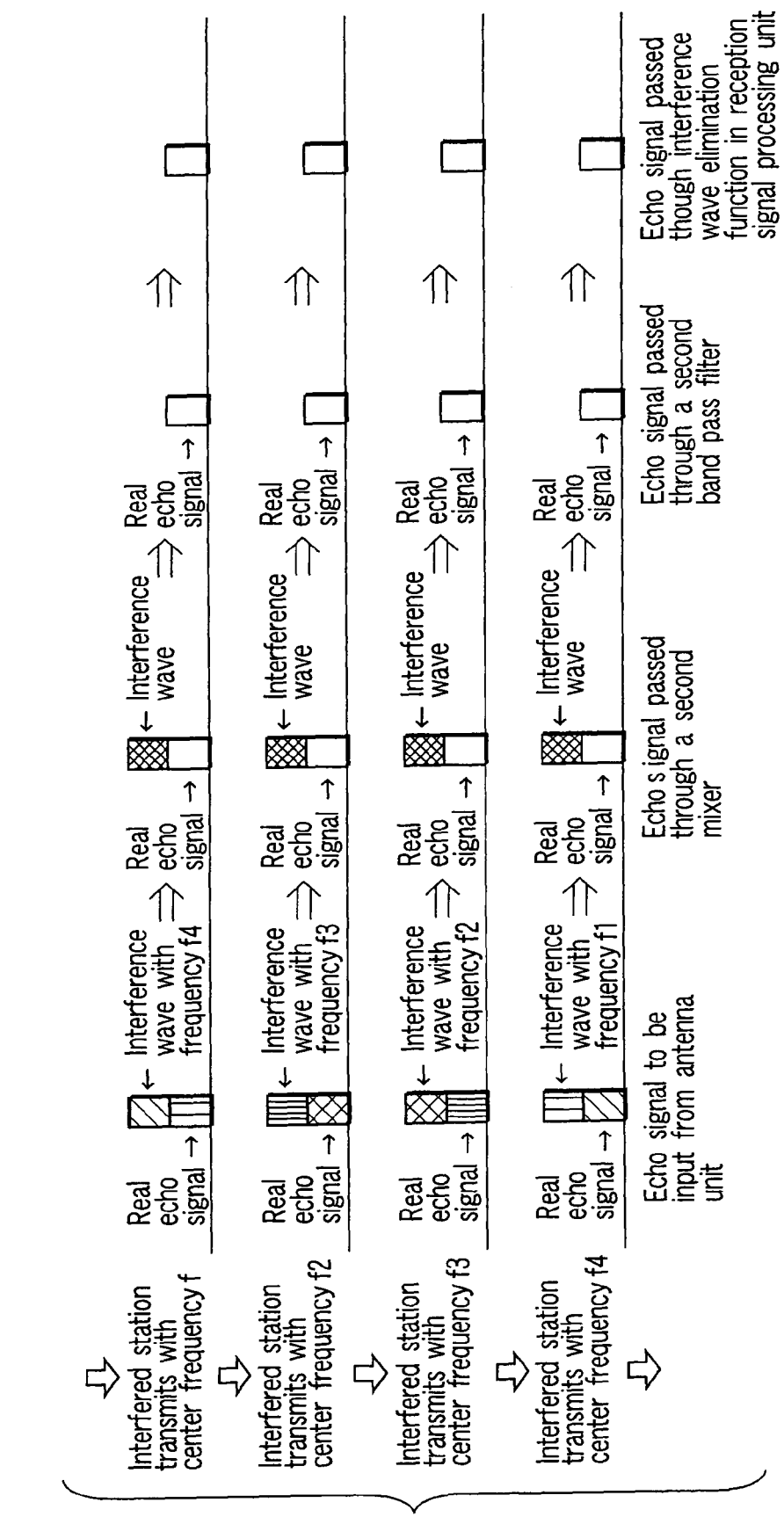
FIG. 4 is a timing diagram illustrating an example in the case in which the invention is applied to both an interfered station and interfering station to vary the center frequencies for each transmission.

FIG. 4 shows an example of the case in which the present invention is applied to the interfered station to vary the center frequencies in order of f1, f2, f3 and f4 for each transmission, and further, the invention is applied to the interfering station to vary the center frequencies in order of f4, f3, f2 and f1 for each transmission so as not to overlap with one another in a different timing from that of the interfered station. Like this, by applying the invention to both the interfered station and interfering station, all interference waves are removed when they pass through the second band pass filter 23.

Replacing the interference waves in FIG. 2, FIG. 3 and FIG. 4 with the secondary echo shows that the invention is also effective in removing the secondary echo.

Therefore, the radar device having the foregoing configuration reduces the effects of the interference waves and secondary echo by using a plurality of frequencies within the assigned frequency bands and by varying the center frequencies of the transmission signals to be emitted for each transmission. Accordingly, even if the PRFs of the interfering stations are close to one another or the number of the interfering stations is large, the radar device can reduce the effects on the received and processed data caused by the interference waves, and can reduce the effects of the secondary echo to improve the detection precision of the real echo signal to this reduction.

The invention of the aforementioned embodiment having varied the oscillation frequency of the local oscillator 15 and the frequency property of the first band pass filter 17 by the frequency control unit 13 for each transmission and having enabled the transmission frequency of the transmission signal emitted to the atmosphere to be varied, is not limited to this, and is also achievable in the case in which the frequency of the transmission sort signal transmitted from the transmission sort signal generation unit 12, the frequency of the signal processed by the reception signal processing unit 14, and the frequency properties of the first and second band pass filters 17 and 23 are varied, in the case in which only the oscillation frequency from the local oscillator 15 is varied, or in the case in which the frequency of the transmission sort signal transmitted from the transmission sort signal generation unit 12 and the frequency of the signal processed by the reception signal processing unit 14 are varied. The types of the transmission sort signal are achievable by adopting an unmodulated pulse signal and an amplitude or frequency-modulated pulse signal, and the invention is applicable to a transmitting/receiving system in a double super heterodyne method. The function of extracting only the signal with the desired frequency component by removing the interference waves different in center frequency and the unnecessary signal such as a secondary echo, in the second band pass filter 23 can be also be realized via digital processing, such as by Fourier transform processing.

When the invention is applied to all the radar devices of the radar sites in the same assigned frequency band, by switch-controlling frequencies of the transmission signals so that the waves of the radar sites do not associate to overlap with one another, mutual interference is avoided. In the future, it is expected that the assigned frequency bands will be further narrowed, and thus this invention is very effective from the point of view of making effective use of frequency bands.

In addition, the invention is not limited to the specific details and representative embodiments shown and described herein, and in an implementation phase, this invention may be embodied in various forms without departing from the spirit or scope of the general inventive concept thereof. Various modifications of the invention can be made by appropriately combining a plurality of constituent elements disclosed in the foregoing embodiments. Some of the constituent elements, for example, may be omitted from the whole of the constituent elements shown in the embodiments. Further. The constituent elements over different embodiments may be appropriately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The present invention is usable for all types of primary radar device, such as an airport surveillance radar (ASR), a precision approach radar (PAR), and a weather radar (W/R).

What is claimed is:

1. A method for avoiding mutual interference among radar sites, each radar site performing:

generating selectively a set of a plurality of transmission signals differing from one another in center frequency;
emitting the transmission signals;
switching the center frequencies of the transmission signals for each emission of the transmission signals; and
associating one or more other radar sites as potentially interfering radar sites and controlling the switching of center frequencies of the associated potentially interfering radar sites so that each of the center frequencies of each of the potentially interfering radar sites do not overlap upon switching of center frequencies for each emission.

2. The method for adjusting among the radar sites according to claim 1, wherein each of the radar sites removes a frequency component of a second transmission signal emitted from interfering radar sites or a frequency component of an echo signal emitted from the interfering radar sites and reflected from an object, from each of reception signals corresponding to the transmission signals, a center frequency of the second transmission signal or the echo signal being close to the center frequency of each of the transmission signals.

3. The method for adjusting among radar sites according to claim 1, wherein each of the radar sites removes secondary echo signals other than the types or timing of the transmission signals.

* * * * *